US008866050B2

(12) United States Patent  
McBean et al.

(10) Patent No.: US 8,866,050 B2  
(45) Date of Patent: Oct. 21, 2014

(54) BABY BOTTLE WARMER AND METHOD OF USING SAME

(75) Inventors: John M. McBean, Boston, MA (US); Kailas N. Narendran, Warwick, RI (US)

(73) Assignee: Kiinde, LLC, Warwick, RI (US)

( * ) Notice: Subject to any disclaimer, the term of this patent is extended or adjusted under 35 U.S.C. 154(b) by 384 days.

(21) Appl. No.: 13/231,650

(22) Filed: Sep. 13, 2011

(65) Prior Publication Data

US 2012/0061376 A1 Mar. 15, 2012

Related U.S. Application Data

(60) Provisional application No. 61/403,346, filed on Sep. 14, 2010.

(51) Int. Cl.
*A47J 36/26* (2006.01)
*F28D 21/00* (2006.01)
*A47J 36/24* (2006.01)

(52) U.S. Cl.
CPC .................................. *A47J 36/2438* (2013.01)
USPC ........... 219/430; 219/386; 219/432; 219/433; 219/441; 165/104.31

(58) Field of Classification Search
None
See application file for complete search history.

(56) References Cited

U.S. PATENT DOCUMENTS

| | | | |
|---|---|---|---|
| 1,828,628 A * | 10/1931 | Torgerson | 126/261 |
| 2,137,676 A * | 11/1938 | Martin | 165/72 |
| 2,428,996 A | 10/1947 | Schworm, Jr. | 219/19 |
| 2,843,719 A | 7/1958 | Smith et al. | 219/40 |
| 3,402,763 A * | 9/1968 | Peterson | 165/46 |
| 3,585,362 A | 6/1971 | Hoogesteger | 219/437 |
| 3,804,076 A | 4/1974 | Fant et al. | 126/261 |
| 3,892,945 A * | 7/1975 | Lerner | 219/437 |
| 4,117,045 A | 9/1978 | Henke et al. | 261/30 |
| 4,119,248 A | 10/1978 | Butler et al. | 224/5 W |
| 4,163,471 A * | 8/1979 | Leder | 165/80.5 |
| 4,165,456 A | 8/1979 | Dogliotti | 219/449 |
| 4,365,143 A | 12/1982 | Kerber, Jr. | 219/401 |
| 4,376,096 A | 3/1983 | Bowen | 422/116 |
| 4,441,336 A | 4/1984 | Cannon | 62/457 |
| 4,457,079 A | 7/1984 | Jodrey et al. | 34/105 |
| 4,461,735 A | 7/1984 | Wirt | 261/104 |
| 4,488,657 A | 12/1984 | Deland | 215/303 |
| 4,534,484 A | 8/1985 | Deland | 215/307 |
| 4,597,435 A * | 7/1986 | Fosco, Jr. | 165/80.5 |
| 4,716,278 A | 12/1987 | Cappe et al. | 219/521 |
| 4,801,782 A | 1/1989 | Ineson | 219/438 |
| 4,878,588 A | 11/1989 | Ephraim | 215/11.2 |
| 5,103,801 A | 4/1992 | Herring et al. | 126/374 |

(Continued)

FOREIGN PATENT DOCUMENTS

FR 2788677 A1 * 7/2000 ............. A47G 23/04

*Primary Examiner* — Joseph M Pelham
(74) *Attorney, Agent, or Firm* — Sunstein Kann Murphy & Timbers LLP

(57) ABSTRACT

A warmer, for a baby bottle, includes a warming chamber configured to hold the bottle and to place water received in the chamber in contact with the bottle; a heater, in thermal communication with the water, that heats the water to a temperature below its boiling point; and a water disposal system that automatically causes displacement of water relative to the bottle so as to substantially remove water from contacting the bottle, after the bottle has been warmed by the water. Other embodiments of the warmer are provided, along with related methods.

19 Claims, 8 Drawing Sheets

(56) References Cited

U.S. PATENT DOCUMENTS

| | | | |
|---|---|---|---|
| 5,129,033 A | 7/1992 | Ferrara et al. | 392/447 |
| D334,504 S | 4/1993 | Edwards | D7/326 |
| 5,317,128 A | 5/1994 | Yao | 219/433 |
| 5,390,804 A | 2/1995 | Beggins | 215/100 R |
| 5,539,185 A | 7/1996 | Polster | 219/439 |
| 5,682,932 A | 11/1997 | Ediger | 141/366 |
| 5,689,967 A | 11/1997 | Floysvik | 62/255 |
| D387,239 S | 12/1997 | Johnstone | D7/326 |
| 5,773,795 A | 6/1998 | Messmer | 219/441 |
| D398,484 S | 9/1998 | Duggan | D7/603 |
| 5,975,337 A | 11/1999 | Hadley | 220/592.17 |
| 6,052,511 A | 4/2000 | Birdsell | 392/406 |
| 6,100,504 A | 8/2000 | Wagner | 219/432 |
| 6,234,165 B1 | 5/2001 | Creighton et al. | 126/263.06 |
| 6,286,564 B1 | 9/2001 | Wallace | 141/18 |
| 6,310,329 B1 | 10/2001 | Carter | 219/432 |
| 6,417,498 B1 * | 7/2002 | Shields et al. | 219/521 |
| 6,427,863 B1 | 8/2002 | Nichols | 220/592.17 |
| 6,437,295 B1 | 8/2002 | Hogg et al. | 219/439 |
| 6,528,766 B1 | 3/2003 | Parks et al. | 219/386 |
| 6,571,564 B2 * | 6/2003 | Upadhye et al. | 62/3.3 |
| 6,703,590 B1 * | 3/2004 | Holley, Jr. | 219/432 |
| 6,824,126 B2 | 11/2004 | Keller et al. | 261/97 |
| 6,861,618 B2 * | 3/2005 | Binet et al. | 219/433 |
| 6,906,289 B2 * | 6/2005 | Serres Vives et al. | 219/386 |
| 6,910,594 B2 | 6/2005 | Foley et al. | 215/11.1 |
| 7,002,111 B2 * | 2/2006 | Bauer | 219/480 |
| 7,061,832 B1 * | 6/2006 | Lansing | 368/10 |
| 7,158,717 B2 | 1/2007 | Young et al. | 392/444 |
| 7,464,559 B2 | 12/2008 | Chu et al. | 62/171 |
| 7,614,420 B2 | 11/2009 | Rustad et al. | 137/430 |
| 2003/0074903 A1 * | 4/2003 | Upadhye et al. | 62/3.3 |
| 2004/0140304 A1 * | 7/2004 | Leyendecker | 219/386 |
| 2004/0149768 A1 | 8/2004 | Scoville et al. | 221/135 |
| 2006/0213205 A1 | 9/2006 | Reverendo | 62/3.3 |
| 2010/0126492 A1 | 5/2010 | St. Etienne | 126/263.01 |

* cited by examiner

SECTION A-A

BABY BOTTLE WARMER AND METHOD OF USING SAME

The present application claims priority from U.S. provisional application Ser. No. 61/403,346, filed Sep. 14, 2010, which is hereby incorporated herein by reference in its entirety.

TECHNICAL FIELD

The present invention relates to baby bottle warmers, and more particularly to baby bottle warmers that use warm water as a means of heating a baby bottle.

BACKGROUND ART

Many techniques and devices exist for warming baby bottles and baby food. It is often the case that babies prefer to have their meals (milk, food, etc) warmed up to a temperature that is close to body temperature. Several common ways to warm a baby's bottle of milk (or formula, or other source of nourishment) are: run warm tap water over the bottle; heat a pot of water on the stove top, and put the bottle in the pot of warm water; heat the bottle (containing milk) in the microwave; or use a commercially-available food and/or bottle warmer.

Bottle warmers exist, have been produced, and are sold in an attempt to simplify the lives of parents, by making the process of warming baby's milk, formula, or food faster, easier, cleaner, safer, and simpler. The following types of bottle warmers exist today and are readily available:

Steam warmers: These devices boil a small amount of water, converting it to steam in a small warming chamber. The baby's bottle (containing milk, formula, or other food) is inserted into the warming chamber while the steam is being produced. The hot steam raises the temperature of the bottle and its contents. A representative example is disclosed in U.S. Pat. No. 6,861,618.

Water bath warmers: These devices use a cup-like chamber to hold a bath of water. The devices heat the water bath to a temperature sufficient for heating a baby bottle containing milk. The baby's bottle (containing milk, formula, or other food) is at least partially submerged in the bath of heated water. After some time, the contents of the bottle are warmed. A representative example is disclosed in U.S. Pat. No. 5,773,795 (directed to a warming device generally).

There are many shortcomings to each of the existing approaches to warming babies' food and milk. Most of the existing techniques fail in at least one of the following ways: they are too slow; they are inconvenient because they require the use of dishes, pots and pans, large kitchen appliances, and other devices that need to be cleaner; they are unsafe because they can overheat the contents of the bottle if they are not closely monitored, and the bottle removed at just the right time; they are unhealthy because they are believed to damage some of the nutrients contained in milk, by exposing the milk to boiling (or higher) temperatures; they are inconvenient because they require constant monitoring; they are unsafe because they expose glass and plastic bottles to high temperatures that could be damaging to these materials, or that could cause these materials to release harmful chemicals into the air or the baby's food; they are unsafe because they can cause "hot spots" in heated liquids—regions of very high temperature that could burn a baby; or they are inconvenient because they require measuring or adding water with each use.

Despite these substantial shortcomings in terms of safety and convenience, designs have continued to fall short for many years.

SUMMARY OF THE EMBODIMENTS

In a first embodiment of the invention there is provided a warmer, for a baby bottle. In this embodiment, the warmer includes a warming chamber configured to hold the bottle and to place water received in the chamber in contact with the bottle; a heater, in thermal communication with the water, that heats the water to a temperature below its boiling point; and a water disposal system that automatically causes displacement of water relative to the bottle so as to substantially remove water from contacting the bottle, after the bottle has been warmed by the water. Optionally, the warmer further includes a pump, in fluid communication with the warming chamber, that causes circulation of the water around the bottle in the chamber. Alternatively, or in addition, the warmer further includes a pump, in fluid communication with the warming chamber, that causes the water level in the warming chamber to rise relative to the bottle. Also alternatively or in addition, the warmer further includes an ultraviolet light source in communication with the water, that sterilizes the water. Alternatively or in addition, the warmer further includes a timer, coupled to the heater and a power input, so as to terminate power to the heater after predetermined amount of time.

In a further related embodiment, the warmer further includes at least one thermostat, electrically coupled to the heater and a power input, that limits the temperature to which the water is heated. Alternatively or in addition, the warmer further includes a reservoir to store water. Optionally, the warmer further includes a pump in fluid communication with the warming chamber that moves water from the reservoir to the warming chamber.

In another further related embodiment, the water disposal system includes a reservoir to store water and a pump that moves water from the reservoir to the warming chamber, configured so that when the pump is turned off, the water substantially drains from the warming chamber to the reservoir, thus substantially removing the water from contacting the bottle. Optionally, the pump is configured so that after the pump has been turned off, water flows from the chamber, through the pump, to the reservoir.

In another further related embodiment, the water disposal system includes a reservoir that stores water; and a drain hole system in the warming chamber through which water drains at a drainage rate to the reservoir; and a pump configured to pump water from the reservoir to the warming chamber at a rate faster than the drainage rate, until the water in the warming chamber has reached a desired level, so that, when the pump is turned off, water drains from the warming chamber, through the drain hole system, to the reservoir, thus substantially removing the water from contacting the bottle. Optionally, the drain hole system includes at least one hole near the bottom of the warming chamber, and an overflow drain at a higher level in the warming chamber.

In another further related embodiment, the water disposal system includes a valve configured to cause flow of water out of the warming chamber after the bottle has been warmed by the water.

In another embodiment the invention provides a warmer, for a baby bottle, including a warming chamber configured to hold the bottle and to place heated water received in the chamber in contact with the bottle; and a water disposal system that automatically causes displacement of water relative to the bottle so as to substantially remove water from contacting the bottle, after the bottle has been warmed by the water.

In yet another embodiment of the invention there is provided a method of warming a baby bottle. In this embodiment, the baby bottle is disposed in a warming chamber configured to hold the bottle and to place water received in the chamber in contact with the bottle. The method includes heating water in communication with the chamber to a temperature below the water's boiling point; circulating the water around the bottle in the chamber; and after the bottle has been warmed, operating a water disposal system to automatically substantially remove water from contacting the bottle. Optionally, the method further includes draining water from the warming chamber into a reservoir at a drainage rate, and pumping water from the reservoir to the warming chamber at a rate faster than the drainage rate, until the water in the warming chamber has reached a desired level, so that, when the pump is turned off, the water substantially drains from the warming chamber to the reservoir, thus substantially removing the water from contacting the bottle.

In another embodiment, the invention, there is provided a method of warming a baby bottle, and the baby bottle is disposed in a warming chamber configured to hold the bottle and to place water received in the chamber in contact with the bottle. The method includes heating water in communication with the chamber to a temperature below the water's boiling point; raising the water level relative to the bottle in the chamber; and after the bottle has been warmed, operating a water disposal system to automatically substantially remove water from contacting the bottle. Optionally, the method further includes draining water from the warming chamber into a reservoir at a drainage rate; and pumping water from the reservoir to the warming chamber at a rate faster than the drainage rate, until the water in the warming chamber has reached a desired level, so that, when the pump is turned off, the water substantially drains from the warming chamber to the reservoir, thus substantially removing the water from contacting the bottle.

In yet another embodiment, the invention provides a method of warming a baby bottle, and the baby bottle disposed in a warming chamber configured to hold the bottle and to place water received in the chamber in contact with the bottle. The method includes adding water to the warming chamber; heating the water to a temperature below its boiling point; and after the bottle has been warmed, operating a water disposal system to automatically substantially remove water from contacting the bottle.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
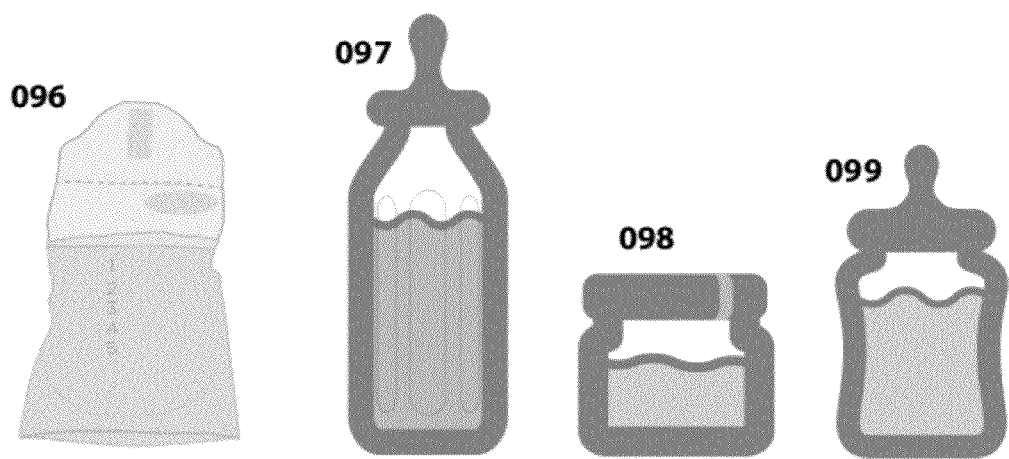
FIG. 1 shows different types of containers that may be used a warmer in accordance with the present invention. They are all referred to as "bottles". They include: breastmilk storage bags 096, large glass or plastic bottles 097, food jars 098, small glass or plastic bottles 099.

Definitions. As used in this description and the accompanying claims, the following terms shall have the meanings indicated, unless the context otherwise requires:

A "warmer" (sometimes herein a "bottle warmer" or "baby bottle warmer") is an embodiment of the present invention.

A "bottle" is any container that holds a substance that is to be heated. The substance may include, but is not limited to, breast milk, mixed baby formula, baby food, food, etc. The container may be a baby bottle, a bag, a cup, a mug, a bowl or dish, a water bottle, a baby food jar, a can, a frozen or thawed breast milk bag, a resealable container, etc.

A "platform" or "basket" is a mechanical part of the warmer, designed to support or hold the bottle. In some embodiments, the platform or basket may be a substantially flat plastic part that holds the bottle. Optionally, the platform or basket raises the bottle out of the water after the bottle is warmed. The platform may be stationary, or movable. The platform may be moved manually by a person, or it may be moved automatically by components of the warmer.

A "heater" is a device that heats water to be used in warming the bottle. The heater may be electric or chemical. The heater may be located in the warming chamber, or in the reservoir (in embodiments with a reservoir).

The warmer is considered "active" when it is in a mode used for heating the water. In embodiments without a timer, the start of the active cycle is indicated by user input: pushing a button, turning a knob, adding water, placing a bottle in the warming chamber, etc. In embodiments without a timer, the end of the active cycle is indicated by the permanent termination of the flow of electrical or chemical energy into the heater. During the active cycle, the flow of energy into the heater may be temporarily interrupted by the thermostats. However, after the end of the active cycle, the flow of electrical or chemical energy into the heater is permanently terminated, until the active cycle is started again (by user input, as described above). For the purpose of this definition, permanently terminated means terminated until user input starts the active cycle again.

"Duration of activation" is the length of time during which the warmer is active.

The "active cycle" of the warmer is the time during which the warmer is active.

A "timer" is a device, either mechanical, electrical, electro-mechanical, chemical, fluidic, or other, that measures the passage of time. The timer may simply keep track of time, or it may also control (or switch on and off) the flow of electrical power to components of the warmer (as functions of time). The timer may also display the elapsed time, and/or the time remaining in the active cycle. The timer may also mechanically act upon components of the system, causing them to move. For example, a mechanical timer may release a latch or switch at certain times during its cycle, causing other components in the system to move. The timer may be set by the user, or may be set by the device itself according to measurements taken by the device, or according to the physical state of the device, its contents, and its environment. A user may set the desired time, for example, by rotating a knob, pushing buttons, adding a specific amount of water to a container, or moving a mechanical lever. The timer may be digital or analog. The timer may display the time, for example, using demarcations around a rotating knob, or using numbers represented on a screen. Whether set automatically or by a person, the set time on the timer determines when the device is active.

A "pump" is a mechanical, fluidic, electrical, or electro-mechanical device that transfers fluid from one location to another. The pump may transfer water between the warming chamber and the reservoir (in embodiments with a reservoir), or between the warming chamber or reservoir and some external location (for example, a sink). The pump may also simply move the water around within the warming chamber. The pump may be electrically operated, or manually operated.

A "warming chamber" is a region of the warmer designed to hold the bottle, to receive water, and to place the bottle in contact with the water.

A "water line" is the top surface of the water (at the water/air interface) in the warming chamber.

A "reservoir" is the region of the warmer that stores water that is not necessarily in contact with the bottle or the warming chamber. For example, at the end of the active cycle, the warm water may drain from the warming chamber to the reservoir, where it will no longer be in contact with the bottle. In some embodiments, the reservoir may be in fluid communication with the warming chamber at all times, or only at certain times during warming.

A "thermostat" is a device that controls the operational state of at least one of the components of the warmer, based on temperature.

A bottle is considered to be "warmed" once the bottle's contents have risen to a desired temperature. "Bottle has been warmed" means that the bottle's contents have risen to a desired temperature.

A "drain hole system" is an arrangement of at least one drain hole, through which water drains from the warming chamber. This may include, but is not limited to:
a hole or holes near the bottom of the warming chamber through which water drains from the warming chamber, or a hole or holes near the top of the warming chamber through which water drains from the warming chamber once the water level reaches a certain height (overflow drain).

An "overflow drain" is a hole or system of holes that allows water to flow out of the warming chamber, into the reservoir, when the water level in the warming chamber reaches a certain height.

A "water disposal system" is a system that automatically causes displacement of water relative to the bottle so as to substantially remove the water from contacting the bottle A "valve" is a device that may open or close to allow or disallow the flow of fluid through it. A valve may be actuated manually or automatically. A valve may be controlled electrically, mechanically, electro-mechanically, or thermally.

To "hold" is to physically support in any way. For example, a platform or warming chamber to hold a bottle may mean simply supporting a bottle from its bottom, squeezing it from its sides, completely or partially surrounding it, providing a surface or surfaces for the bottle to lean on or against, or containing liquid in which the bottle may float.

Embodiments herein provide substantial improvements over existing techniques and devices for heating a baby's milk, formula, or other food.

The main improvements over the prior art are as follows:

Embodiments of the invention do not use boiling water or steam to warm the bottle; instead they use a bath of warm water. As a result, concerns of hot spots, damage due to overheated materials, burns while interacting with the device, damage to nutrients in milk, and overheating are alleviated.

Embodiments of the invention will not continue to heat the bottle if left unattended; they will first shut off power to the heater, and completely remove the bottle from the heat source as soon as the prescribed time has passed. This design feature is a substantial improvement as it significantly reduces the risk of overheating the baby's meal, while greatly increasing the convenience for the parents, as they no longer need to watch over the device to make sure it does not overheat.

Embodiments of the invention warm the contents of the bottle quickly, by circulating the warm water around the bottle, increasing the heat transfer rate from the water to the bottle.

Embodiments of the invention are simple devices that hold a small amount of water and are easy to clean, alleviating ease of use concerns.

With these improvements, embodiments herein provide a widely applicable solution to baby food and bottle warming that is unprecedented in convenience, speed, safety, and applicability to bottles and other containers made of a wide variety of materials.

Embodiments herein are suitable for warming food, milk, breast milk, or mixed baby formula. Embodiments herein warm a baby's meal in the following way:

The baby's meal is placed in a bottle.

The bottle is placed into the warming chamber of the warmer.

In embodiments with a timer, the user may use the timer to set the desired duration of activation of the warmer.

During the active cycle, the heater will raise the temperature of the water in the warmer to a set temperature, which is warmer than body temperature, but below the boiling temperature of water. The water may be in the warming chamber, the reservoir, or both. At different times during the active cycle, the water may circulate between the warming chamber and the reservoir.

The desired temperature of the water in the warmer may be maintained by a thermostat or thermostats, or by other means of controlling the heater. There may be one or multiple thermostats in the warmer. The thermostats may be connected electrically in parallel or in series. It may be the case that any one thermostat can cut electrical power to a component of the warmer (such as a heater), or it may be the case that all thermostats must together cut electrical power to components of the warmer. For example, there may be a thermostat in thermal communication with the water in the reservoir or in the warming chamber. There may also be a thermostat in thermal communication with the heater. The thermostat may be of the type that opens an electrical switch when its temperature exceeds a certain preset temperature (the "open temperature"). The thermostat may close when the temperature drops below a second preset temperature, the "closed temperature" (that may or may not be the same as the "open temperature"). The preset temperatures may be fixed (properties of that particular thermostat), or may be variable, and set by the user. In one case, there may be a thermostat in thermal communication with the heater, and a thermostat in thermal communication with the water in the reservoir. The thermostats may have different (fixed or variable) "open" and "closed" temperatures. In one embodiment, if either one of these thermostats senses a temperature above its "open temperature", it will open an electrical switch. In one embodiment, opening this switch may cause the heater to turn off, but may leave other components of the system (such as a pump) connected to electrical power, and running. The thermostat or thermostats may operate mechanically, fluidically, or electrically. The thermostat may act on other components of the system electrically, mechanically, or fluidically. For example, the thermostat may open or close electrical switches (based on its temperature); or it may push or pull on mechanical components (based on its temperature); or it may open or close fluid valves to allow or disallow the flow of fluids (based on its temperature).

The thermostat or thermostats may maintain the water at an approximately constant temperature while the device is warming the bottle, or it/they may vary the temperature of the water according to any of the following:

Elapsed time,
User-set parameters,
Parameters sensed or measured by the warmer and/or its components,
Pre-determined or pre-set functions (of time, temperature or user-set parameters).

In some embodiments, the warmer may include a pump to circulate the water around the bottle. The pump may also circulate water between the reservoir (if there is a reservoir) and the warming chamber.

When (or shortly after) the active cycle ends, the heater will be turned off. Additionally, at (or shortly following) the end of the active cycle, the warmer may lower the water level in the warming chamber (relative to the bottle) to a position sufficiently low to substantially stop the heating of the bottle by the energy contained in the thermal mass of the water bath. This lowering of the water line may be achieved by opening a drain or valve 118 that drains the water from the warming chamber; this feature is illustrated in FIG. 3 (which is a vertical section of an embodiment of the present invention, similar to that of FIG. 2, described below, but wherein the water disposal system includes a valve).

Lowering of the water line may also be achieved by using an active element such as an electric pump to transfer the water out of the warming chamber. It may also be the case that the water level in the warming chamber is actively raised (using a pump) during the active cycle, and, upon termination of the active cycle, the pump is switched off, and the water drains out of the warming chamber by draining out through the pump, or through a drain hole system.

Figure 4:
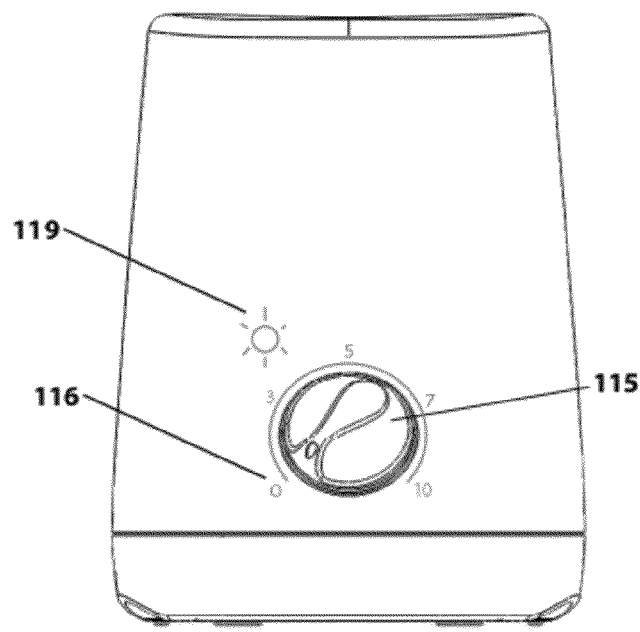
FIG. 4 is a front elevation of an embodiment of the present invention, generally similar to that of FIG. 2, but also including an indicator light 119.

When the bottle is warmed, the warmer may provide a visible or audible indication that the bottle is warm, or it may be the user's responsibility to remove the bottle from the warmer at the appropriate time. Indications that the bottle is warmed may include, but are not limited to:

An audible signal such as a buzz, beep, or bell that is digitally or mechanically controlled,
The absence of an audible sound (such as a ticking or clicking) that is present during the active cycle,
A light 119 or other visible signal that either turns on or off, or changes color (shown in FIG. 4 is a front elevation of an embodiment of the present invention, generally similar to that of FIG. 2, but also including an indicator light 119),
A visible display of text or other signal on a screen (LCD screen, for example),
A mechanical motion of one or more components of the device, or of the bottle itself (for example, the bottle may rise out of the chamber when warmed).

In some embodiments the water may drain out of the warming chamber after the bottle is warmed, simply by flowing back through the pump, with no additional holes required in the warming chamber. In other embodiments, there may be a drain hole system through which the water drains from the warming chamber to the reservoir. In these embodiments (with drain holes), some water may drain out of the warming chamber even while the pump is running, as long as there is water in the warming chamber. In order to substantially fill the warming chamber (or to fill the warming chamber up to the overflow drain), it is necessary that the flow rate of water into the warming chamber from the pump exceeds the flow rate of water out of the warming chamber through the drain hole system.

In some embodiments, there may be a reservoir that holds water that is not in the warming chamber. As the water drains or is pumped out of the warming chamber, the water moves to the reservoir, where it is stored. This has the additional benefit that, for a future use of the device, the user will not need to make a trip to the sink, but can instead re-use the water that is stored in the reservoir.

In some embodiments there may be a manual fluid pump (similar to a lotion or soap pump) that is connected to the reservoir and is used to pump water from the reservoir into the warming chamber.

In some embodiments, the user may manually add water to the warming chamber, and, when the warming cycle is complete, there may be a valve that opens in or near the bottom of the warming chamber, causing the water to drain out of the warming chamber. The water may drain out of the warming chamber into a sink (or other external location), or into a reservoir that is coupled to the warming chamber.

In another embodiment, the reservoir may be above the warming chamber, and a pump may pump the water from the warming chamber up to the reservoir after the bottle is warmed.

In another embodiment, the water may not circulate, but there may be a mechanical holder (or platform, or basket) which holds the bottle completely or partially submerged during warming. After the bottle is warmed, the platform may move to substantially remove the bottle from the water.

In one embodiment, the warmer includes a warming chamber with a heater and a timer. The user places the bottle in the warming chamber, the user adds water to the warming chamber, and then sets the desired duration of activation by setting the timer. Setting the timer starts the flow of electricity to the heater. The warmer will continue to warm the water (and consequently the bottle) until the set time has elapsed. While the warmer is active (i.e., the set time has not elapsed), the heater may be turned on and/or off by the thermostat or thermostats. In this embodiment, it may be the case that the warming chamber is constructed substantially from a material with high thermal conductivity, so as to transfer the heat contained in the water away as quickly as possible following the end of the active cycle.

In another embodiment, the warmer may use the water draining out of the warming chamber as the timer. In this embodiment, the user adds water to the warming chamber, and it begins to leak out (either into the reservoir, or other external location such as a sink). The heater warms the water, which in turn warms the bottle. Eventually the water completely drains out, and the bottle substantially stops warming. In some cases there may be a moisture sensor that turns off the heater when the water has drained completely. In some cases the moisture sensor may also turn on the heater when water is added to the warming chamber. In other cases the user may have to manually turn on the heater when the water is added. In some cases, instead of (or in addition to) a moisture sensor, there may be a thermostat in thermal communication with the heater, that senses a rise in temperature when there is no water left in the warming chamber, and turns off the heater based on this temperature or rise in temperature.

In some embodiments, there may be a UV light source in radiant communication with the water (either in the reservoir or in the warming chamber). Such a UV light source would serve to sterilize, or kill germs or bacteria in the water.

In some embodiments, there is a water disposal system. Two examples of water disposal systems are given below:
1) A valve that opens (thermally, electrically, or mechanically) to cause the water to substantially drain out of the warming chamber.
2) A pump that, when it is on, raises the water level in the warming chamber to a desired level. Once the bottle is warmed, or after a set amount of time, the pump turns off, and the water drains out of the warming chamber. As such, the water is substantially removed from contacting the bottle. The water may drain out of the warming chamber in one or both of the following ways:
a. The water may flow back through the pump itself, when the pump is not on;
b. There may be a drain hole system in the warming chamber, through which the water may drain out of the warming chamber. In this case, there may be water flowing out of the warming chamber (via the drain hole system) while the pump is running, but the water level in the warming chamber will rise as a result of the flow rate of water (through the pump) into the warming chamber exceeding the flow rate of water out of the warming chamber through the drain hole system. The water level in the warming chamber will rise until the water in the warming chamber reaches a desired level. A desired level is defined as the level of water in the warming chamber once one or more of the following conditions is met:
i. The water level in the warming chamber reaches the overflow drain;
ii. The flow rate of water out of the warming chamber (through the drain hole system) equals the flow rate of water into the warming chamber (through the pump), due to the pressure change caused the by the increase in water depth in the warming chamber;
iii. The pump can no longer draw water from the reservoir because its intake is not sufficiently submerged or supplied with water.
iv. A mechanism is triggered (e.g., a mechanical or fluidic float switch or float valve) by the water height in the warming chamber, which causes the pump to decrease its flow rate, or to turn off, or which causes the drain hole system to drain at a faster rate.

It is important to note that in some embodiments the pump may be a part of the water disposal system (as described above), while in other embodiments the pump may not be a part of the water disposal system (the pump may simply be used to move or circulate the water in the warming chamber, or between the warming chamber and the reservoir).

In some embodiments, there may be sensors, timers, and/or processing capability in the warmer. The warmer may collect information such as: data obtained from user input; sensed or manually entered environmental conditions; sensed or manually entered parameters of the bottle or its contents; elapsed time; temperatures of the warmer or its components or the bottle or its contents; electrical current, voltage, or power measurements. The warmer may use this information to attempt to predict and/or control any of the following:
the temperature of the bottle or its contents,
the elapsed time,
the warming time required and/or remaining.

FIG. 1 shows different types of containers that may be used a warmer in accordance with the present invention. They are all referred to as "bottles". They include: breast milk storage bags 096, large glass or plastic bottles 097, food jars 098, small glass or plastic bottles 099.

Figure 2:
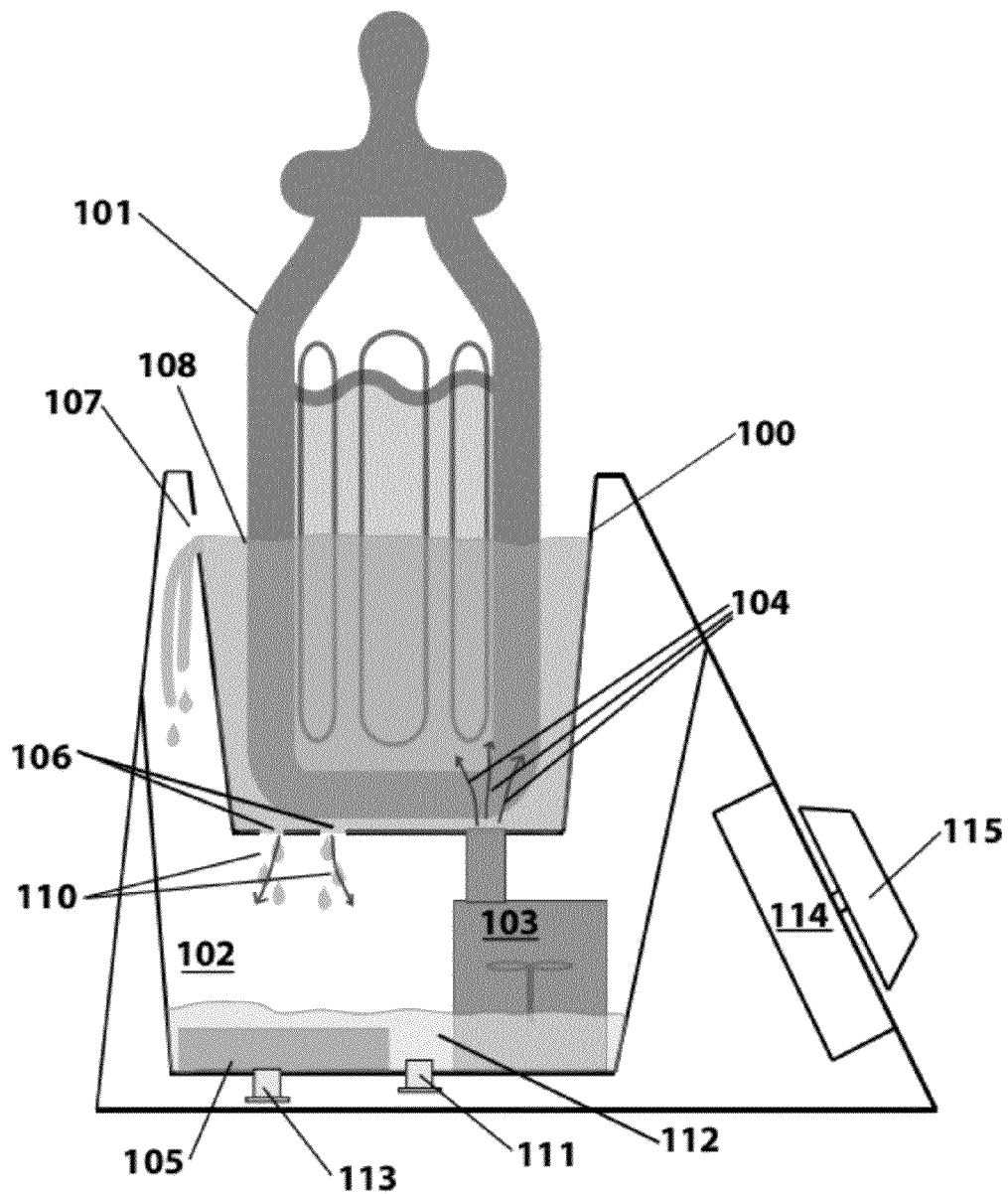
FIG. 2 is a vertical section of an embodiment of the present invention.
Figure 3:
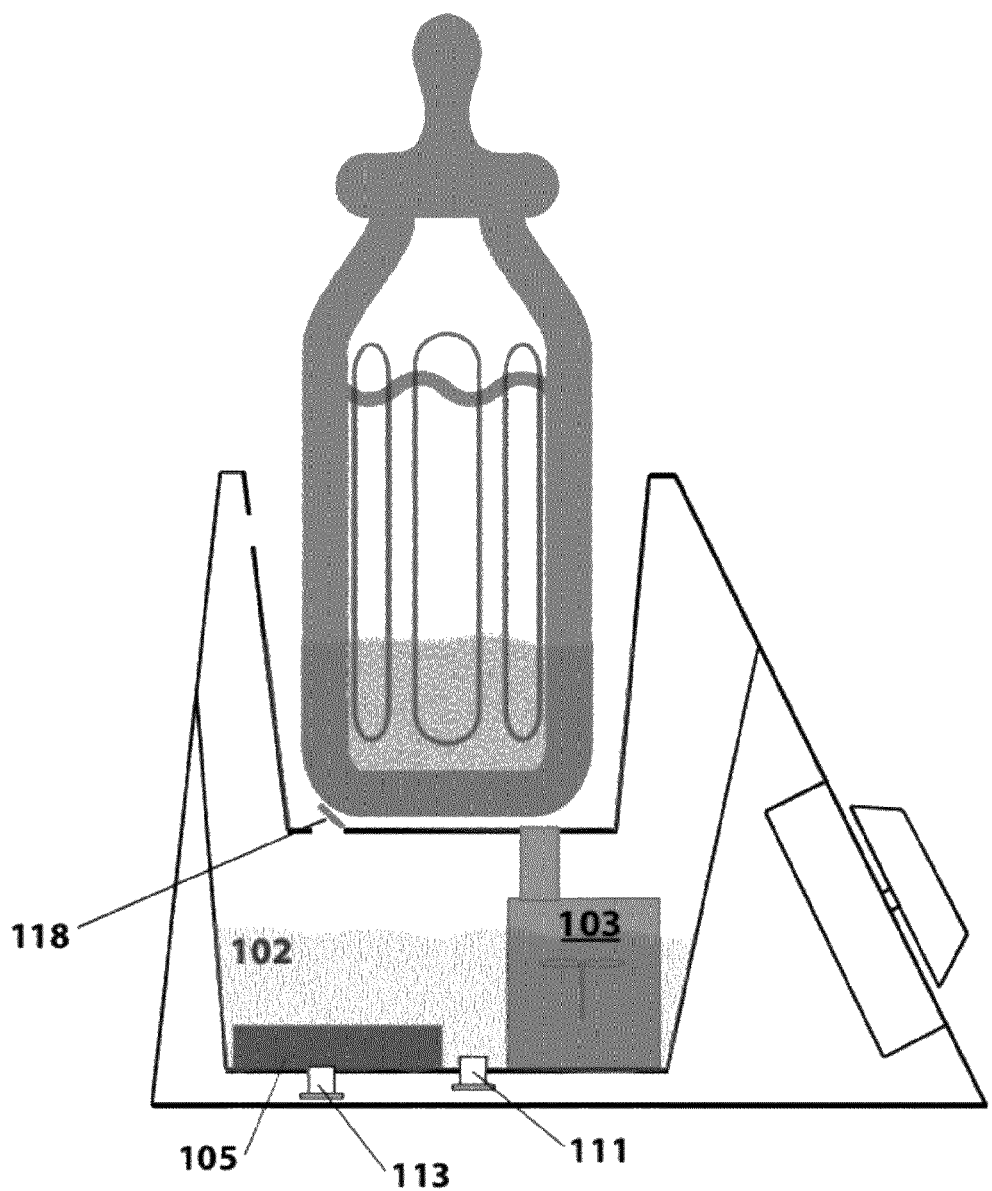
FIG. 3 is a vertical section of an embodiment of the present invention, similar to that of FIG. 2, but wherein the water disposal system includes a valve.

FIG. 2 is a vertical section of an embodiment of the present invention. In this embodiment, the warmer functions as described herein. The warmer has a warming chamber 100, which holds the bottle 101. Underneath (and partially surrounding) the warming chamber, there is a reservoir 102 containing an electric water pump 103. When powered on, the pump causes a water influx 104 from the reservoir up into the warming chamber. At the bottom of the reservoir there is an electric heater 105 that is in thermal contact with the water contained in the reservoir.

The pump is arranged such that, when turned on, it pumps water from the reservoir up into the warming chamber.

There is a drain hole system that includes drain holes 106 in the bottom of the warming chamber, such that water is always draining at some rate from the warming chamber to the reservoir, as long as there is water in the warming chamber.

There is an overflow drain 107 near the top of the warming chamber. If the water level 108 in the warming chamber reaches the overflow drain, water drains through the overflow drain from the warming chamber into the reservoir. As such, the overflow drain prevents the warming chamber from overfilling.

When there is water in the warming chamber 100, There is a water efflux 110 through the drain holes 106. When the pump is turned on, the rate of water influx 104 (via the pump) exceeds the rate of water efflux 110. The result is that the water level 108 in the warming chamber will rise (relative to the warming chamber) until the water level reaches a desired level. Once this state is reached, and for the remainder of the active cycle, the pump will remain on, and the water level will remain approximately constant at the desired level. The desired level is defined as the level of water in the warming chamber once one or more of the following conditions is met:
i. The water level in the warming chamber reaches the overflow drain;
ii. The flow rate of water out of the warming chamber (through the drain hole system) equals the flow rate of water into the warming chamber (through the pump), due to the pressure change caused the by the increase in water depth in the warming chamber;
iii. The pump can no longer draw water from the reservoir because its intake is not sufficiently submerged or supplied with water.

The circulating water during the active cycle increases the heat transfer rate from the water to the bottle and from the heater to the water. As such, the pump serves 2 important functions:

1) It improves heat transfer (vs. still water) between water and bottle AND between heater and water; and
2) It provides a means of ensuring that the bottle and its contents substantially stop warming when the active cycle is complete (by using a pump to maintain the water level, we create a means of draining the warm water out of the warming chamber at the end of the active cycle, simply by turning the pump off and letting the water drain out of the warming chamber through the drain hole system, and through the pump).

There is a water thermostat 111 that is in thermal contact with the water 112 in the reservoir. This thermostat switches the flow of electricity to the heater off and on according to the water temperature in the reservoir. When the temperature exceeds the open temperature of the water thermostat 111, the water thermostat cuts electrical power to the heater. When the temperature drops again to below the closed temperature of the water thermostat, the water thermostat turns the heater back on again. There is also a heater thermostat 113 in thermal contact with the heater, which functions similarly to the water thermostat, but with different open and closed temperatures. As such, the heater thermostat 113 regulates the temperature of the heater.

Figure 7:
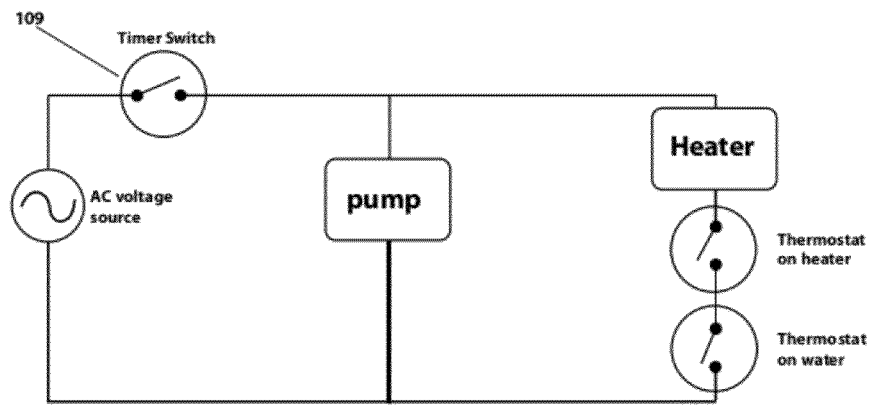
FIG. 7 is an electrical block diagram of an embodiment of the present invention.

There is a timer 114 in FIG. 2, using which the user can set the desired duration of activation of the warmer. FIG. 7 is an electrical block diagram of an embodiment of the present invention, showing the timer 114 as integrating an electrical switch 109 that is closed when the timer knob 115 (shown in FIGS. 2 and 4) points to any time other than "0" 116 (shown in FIG. 4), and is open when the timer knob points to "0". The timer is spring loaded such that, in the absence of significant external forces, it returns to point to "0" at a predetermined rate.

Normal operation of an embodiment of the present invention is as follows:

The user plugs the device into a wall outlet.

Figure 5:
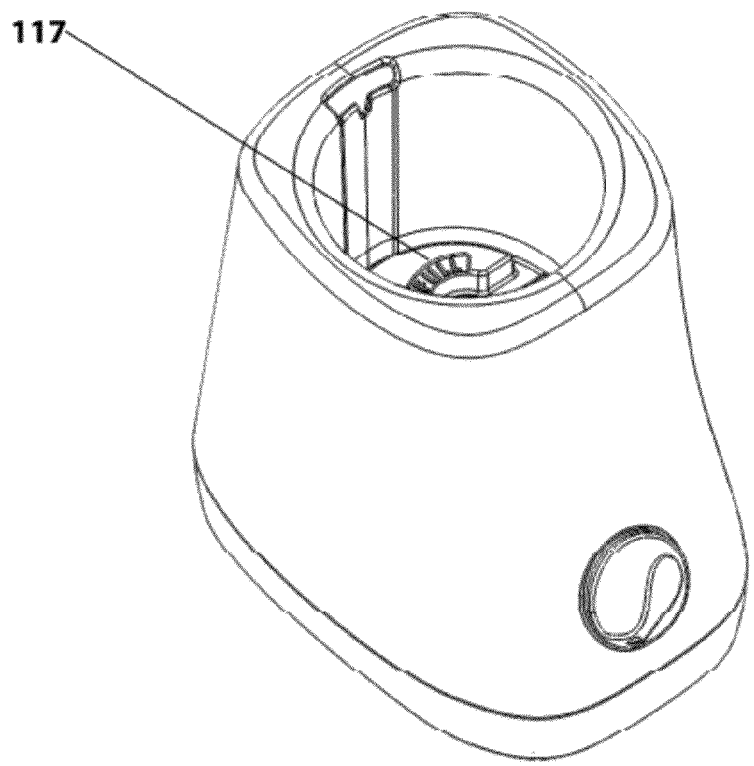
FIG. 5 is a view showing the inside of the warming chamber of an embodiment of the present invention, generally similar to that of FIG. 2, showing the water level fill line 117.

The user adds water approximately to the fill line 117 in the warming chamber (water is added until the reservoir is full up to approximately the level of the bottom of the warming chamber). (FIG. 5 is a view showing the inside of the warming chamber of an embodiment of the present invention, generally similar to that of FIG. 2, showing the water level fill line 117.) The reservoir fills as the water drains from the warming chamber via the drain hole system, and by flowing through the pump.

The user inserts the bottle containing the baby's meal into the warming chamber.

The user turns the timer knob to the desired time, thereby setting the duration of activation of the warmer.

Once the timer is at any time other than "0", the electromechanical switch contained in the timer closes, starting the flow of electricity to the pump and heater, and the active cycle begins. The electric heater is transferring heat to the water, and the pump is actively pumping water from the reservoir up to the warming chamber.

The water level in the warming chamber continues to rise until the water line reaches a desired level, at which point it remains approximately constant until the end of the active cycle. If the water level in the warming chamber reaches the overflow drain, water will flow through the overflow drain down into the reservoir.

During the active cycle, there will be water efflux 110 from the warming chamber down into the reservoir, through the drain hole system.

The temperature of the water continues to rise until the water thermostat or the heater thermostat reach the desired temperature, at which time it/they will switch off and on the power to the heater to limit the temperature of the water. The pump may be connected in such a way that it does not switch off with the heater, as the thermostats open and close the heater circuit. In this case, the pump would be connected electrically in parallel with the heater.

When the timer reaches "0", the electrical circuit is opened, the pump is turned off, and the heater is turned off. Subsequently, the water drains from the warming chamber to the reservoir through the drain hole system, and via efflux 120 through the pump itself.

Figure 6:
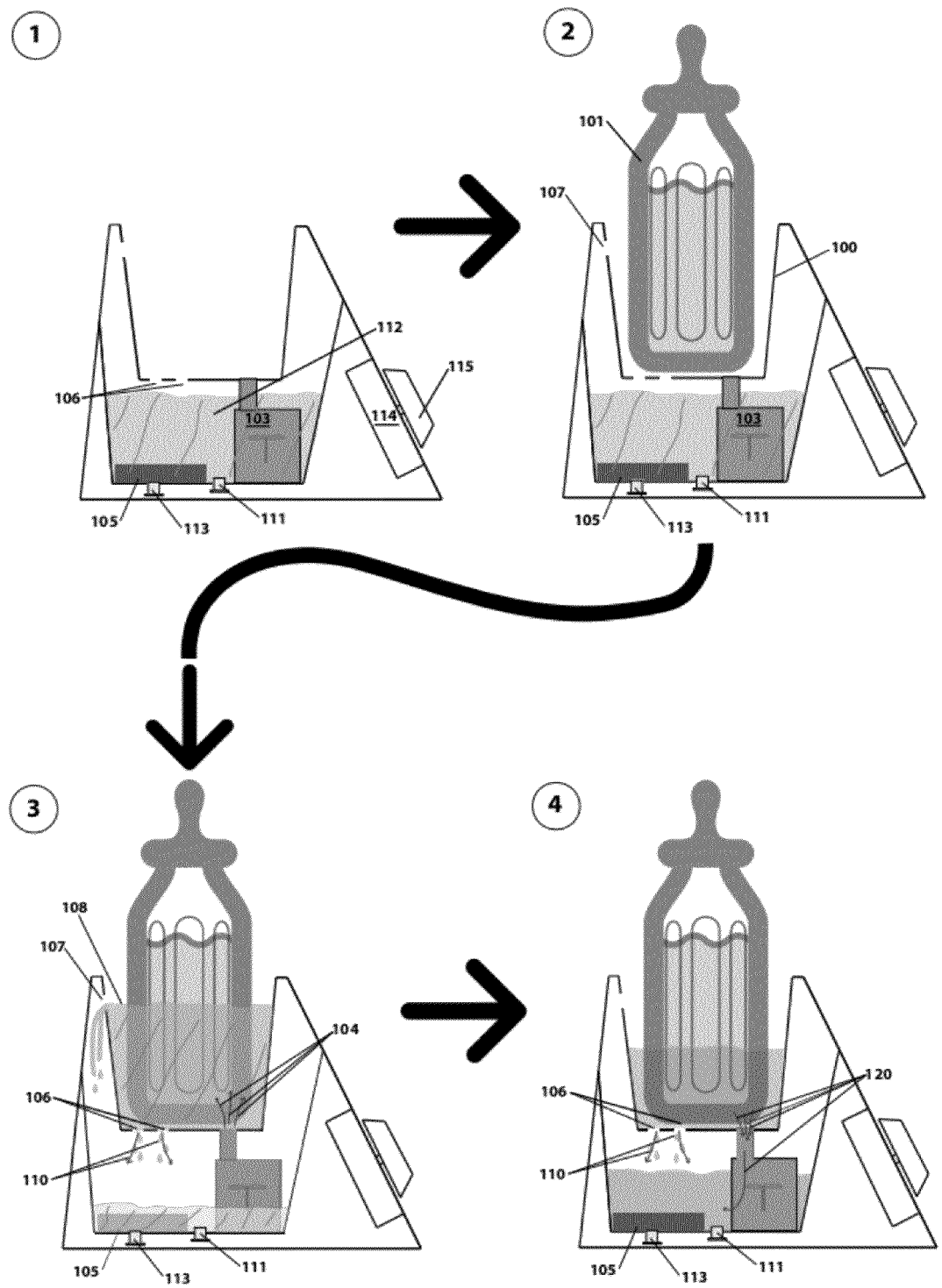
FIG. 6 is a step by step diagram that shows the progression of how an embodiment of the present invention is used.

FIG. 6 shows a step by step progression of the use of an embodiment of the present invention:
1) Water is added to the reservoir (thru the warming chamber).
2) A bottle is inserted into the warming chamber.
3) The timer is set, which turns on the heater and the pump. The pump circulates water up from the reservoir into the warming chamber. The water circulates around the bottle. The water level rises until it reaches the overflow drain, at which point the water runs out through the overflow drain, back down into the reservoir. While the device is on, the water also slowly drains from the warming chamber to the reservoir, through the drain hole system.
4) When the time runs out (and the timer rotates back to "0"), the heater and pump turn off. With the pump off, the water drains from the warming chamber back down to the reservoir, through the drain hole system, and through the pump.

Figure 8:
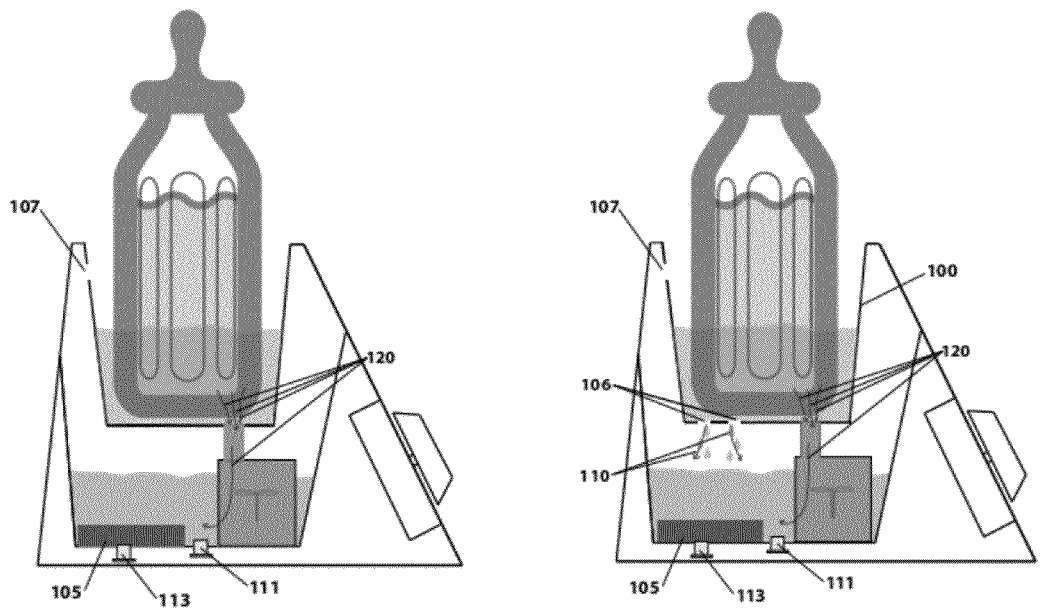
FIG. 8 is a pair of vertical sections of embodiments of the present invention, generally similar to that of FIG. 2, showing alternate water disposal systems: water efflux 120 through the pump; and water efflux 110 through the drain hole system 106.

FIG. 8 is a pair of vertical sections of embodiments of the present invention, generally similar to that of FIG. 2, showing alternate water disposal systems: water efflux 120 through the pump; and water efflux 110 through the drain hole system 106.

Figure 9:
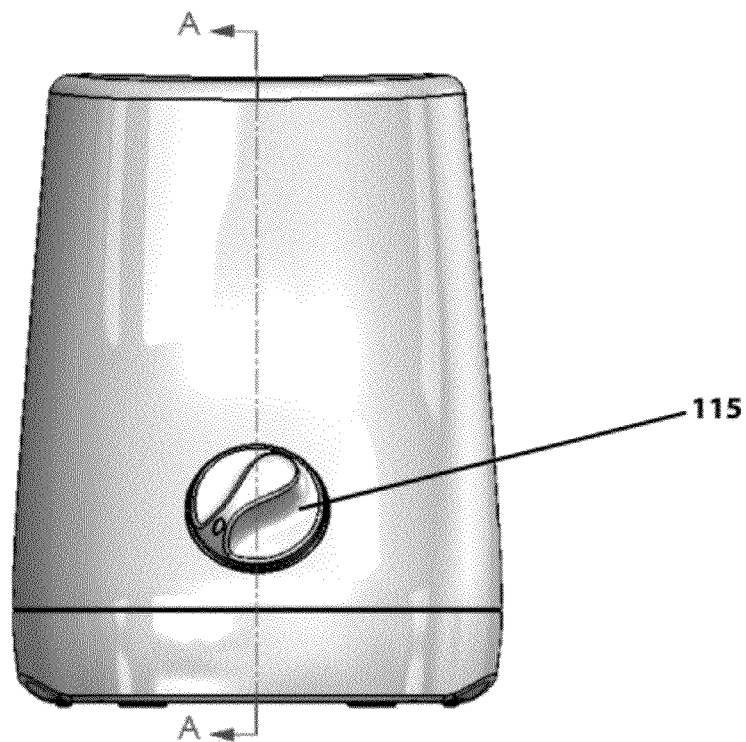
FIG. 9 is a front elevation of an embodiment of the present invention, generally similar to that of FIG. 2, showing the timer knob 115.

FIG. 9 is a front elevation of an embodiment of the present invention, generally similar to that of FIG. 2, showing the timer knob 115.

Figure 10:
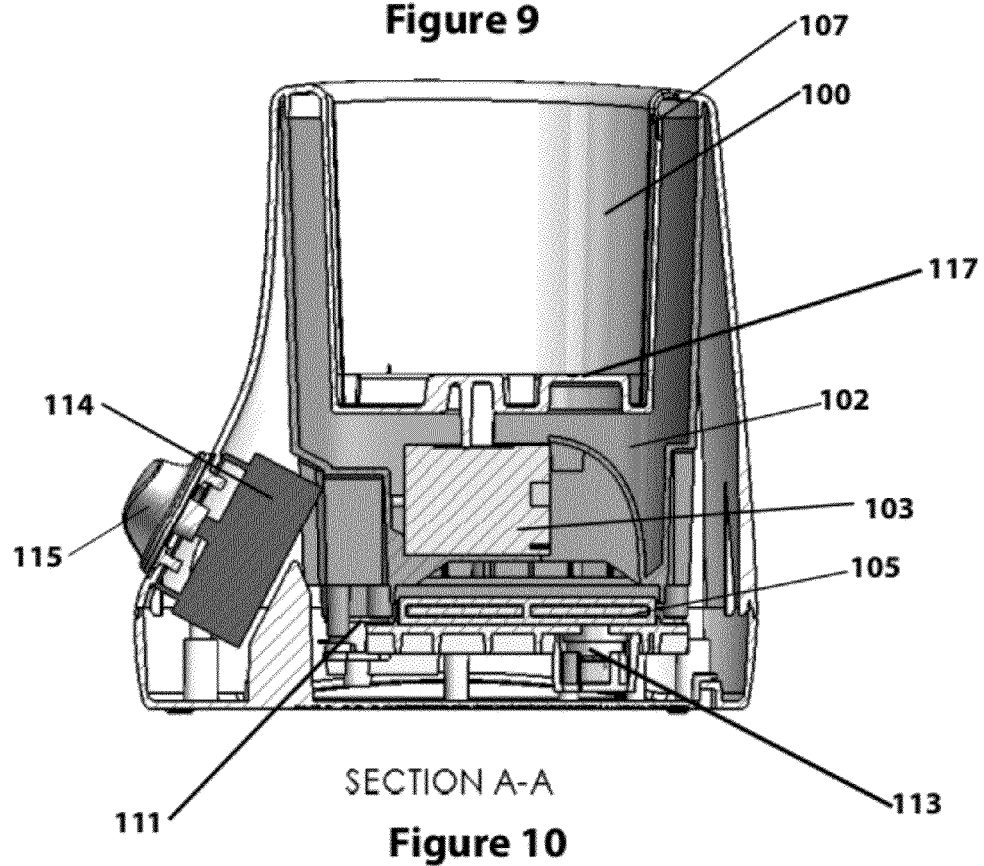
FIG. 10 is a vertical section of an embodiment of the present invention, generally similar to that of FIG. 2.

FIG. 10 is a vertical section of an embodiment of the present invention, generally similar to that of FIG. 2.

Figure 11:
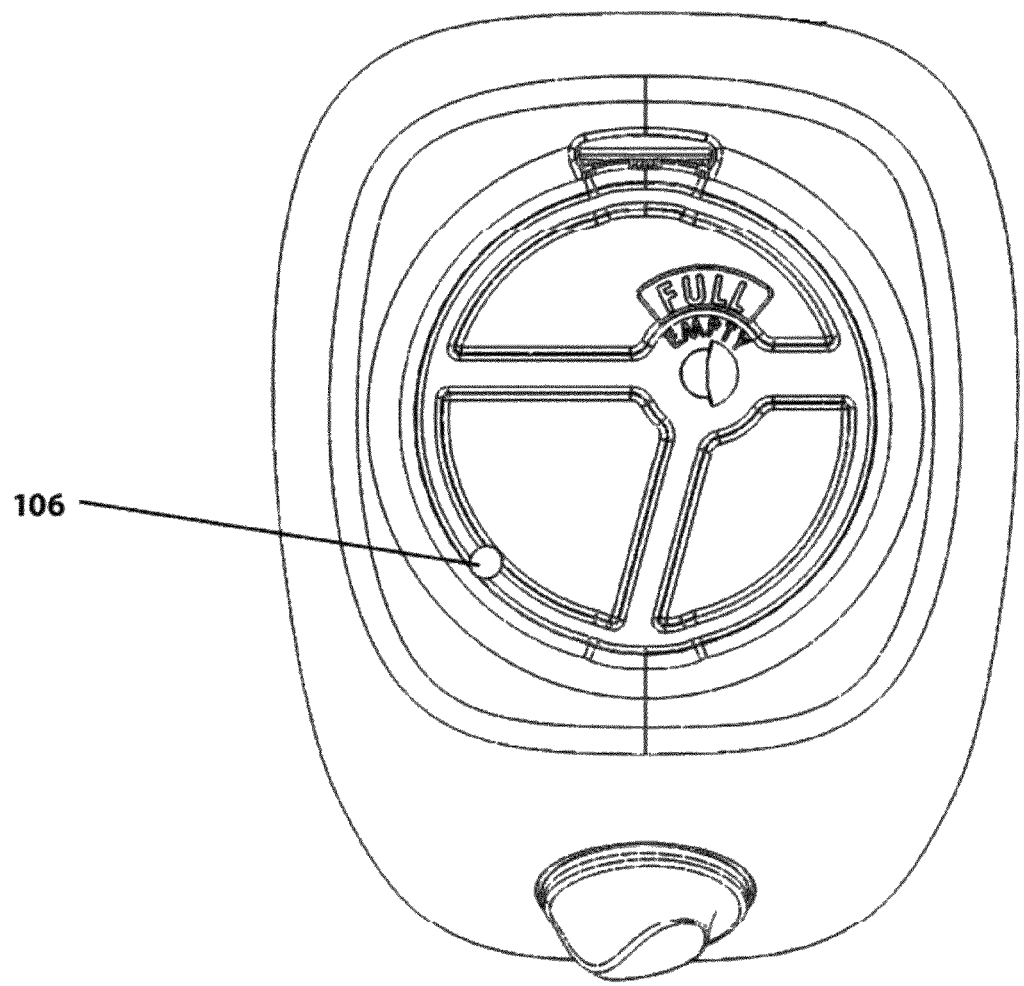
FIG. 11 is a top view of an embodiment of the present invention, generally similar to that of FIG. 2.

FIG. 11 is a top view of an embodiment of the present invention, generally similar to that of FIG. 2.

The embodiments of the invention described above are intended to be merely exemplary; numerous variations and modifications will be apparent to those skilled in the art. All such variations and modifications are intended to be within the scope of the present invention as defined in any appended claims.

What is claimed is:
1. A warmer, for a baby bottle, comprising:
a warming chamber configured to hold the bottle and to hold water received in the warming chamber so as to form a water bath in contact with the bottle;
a heater, in thermal communication with the water, configured to heat the water to a temperature below its boiling point; and
a water disposal system that automatically causes displacement of the water relative to the bottle, wherein the water disposal system includes:
a reservoir configured to store the water; and
a pump disposed within the reservoir, in fluid communication with the warming chamber, and configured to move the water from the reservoir to the warming chamber, wherein the water disposal system is configured so that when the pump is turned off, the water substantially drains from the warming chamber to the reservoir, so as to substantially remove the water from contacting the bottle, after the bottle has been warmed by the water.

2. A warmer according to claim 1, wherein the pump is configured to cause circulation of the water around the bottle in the warming chamber.

3. A warmer according to claim 1, further comprising:
an ultraviolet light source in communication with the water, that sterilizes the water.

4. A warmer according to claim 1, further comprising:
a timer, coupled to the heater and a power input, so as to terminate power to the heater after a predetermined amount of time.

5. A warmer according to claim 1, further comprising:
at least one thermostat, electrically coupled to the heater and a power input, that limits the temperature to which the water is heated.

6. A warmer according to claim 1, wherein the pump is configured so that after the pump has been turned off, water flows from the chamber, through the pump, to the reservoir.

7. A warmer according to claim 1, wherein the water disposal system further comprises:
a drain hole system in the warming chamber through which water drains at a drainage rate to the reservoir,
wherein the pump is configured to pump the water from the reservoir to the warming chamber at a rate faster than the drainage rate.

8. A warmer according to claim 7, wherein the drain hole system includes:
at least one hole near the bottom of the warming chamber, and
an overflow drain at a higher level in the warming chamber, the overflow drain configured to allow the water to flow out of the warming chamber into the reservoir.

9. A warmer according to claim 1, wherein the water disposal system comprises:
a valve configured to cause flow of water out of the warming chamber after the bottle has been warmed by the water.

10. A warmer according to claim 1, wherein the warming chamber includes an overflow drain configured to allow the water to drain from the warming chamber into the reservoir when a water level of the water bath reaches a certain height.

11. A warmer according to claim 1, wherein the pump is configured to maintain the water bath at a substantially constant water level during an active cycle.

12. A warmer, for a baby bottle, comprising:
a warming chamber configured to hold the bottle and to hold heated water received in the warming chamber so as to form a water bath in contact with the bottle; and
a water disposal system that automatically causes displacement of the water relative to the bottle, wherein the water disposal system includes:
a reservoir configured to store the water; and
a pump disposed within the reservoir, in fluid communication with the warming chamber, and configured to move the water from the reservoir to the warming chamber, wherein the water disposal system is configured so that when the pump is turned off, the water substantially drains from the warming chamber to the reservoir, so as to substantially remove the water from contacting the bottle, after the bottle has been warmed by the water.

13. A warmer according to claim 12, wherein the warming chamber includes an overflow drain configured to allow the water to drain from the warming chamber into the reservoir when a water level of the water bath reaches a certain height.

14. A warmer according to claim 12, wherein the pump is configured to maintain the water bath at a substantially constant water level during an active cycle.

15. A warmer according to claim 12, wherein the water disposal system further comprises:
a drain hole system in the warming chamber through which water drains at a drainage rate to the reservoir, wherein the pump is configured to pump the water from the reservoir to the warming chamber at a rate faster than the drainage rate.

16. A warmer according to claim 15, wherein the drain hole system includes:
at least one hole near the bottom of the warming chamber, and
an overflow drain at a higher level in the warming chamber, the overflow drain configured to allow the water to flow out of the warming chamber into the reservoir when a water level of the water bath reaches a certain height.

17. A method of warming a baby bottle, the baby bottle disposed in a warming chamber configured to hold the bottle and to hold water received in the warming chamber so as to form a water bath in contact with the bottle, the method comprising:
heating water in communication with the warming chamber to a temperature below the water's boiling point;
circulating the water around the bottle in the warming chamber; and
operating a water disposal system configured to automatically substantially drain the water bath and remove the water from contacting the bottle after the bottle has been warmed, the water disposal system including:
a reservoir configured to store the water, and
a pump disposed within the reservoir, in fluid communication with the warming chamber, and configured to move the water from the reservoir to the warming chamber, wherein the water disposal system is configured so that when the pump is turned off, the water substantially drains from the warming chamber to the reservoir.

18. A method according to claim 17, further comprising:
draining water from the warming chamber into the reservoir at a drainage rate; and
pumping water from the reservoir to the warming chamber at a rate faster than the drainage rate, until the water in the warming chamber has reached a desired level, so that, when the pump is turned off, the water substantially drains from the warming chamber to the reservoir, thus substantially removing the water from contacting the bottle.

19. A method according to claim 17, further comprising:
draining water from the warming chamber into the reservoir at a drainage rate; and
pumping water from the reservoir to the warming chamber at a rate substantially equal to the drainage rate, so as to maintain the water bath in the warming chamber at a substantially constant water level, so that, when the pump is turned off, the water substantially drains from the warming chamber to the reservoir, thus substantially removing the water from contacting the bottle.

* * * * *